United States Patent [19]

Drent

[11] Patent Number: 5,210,176
[45] Date of Patent: May 11, 1993

[54] POLYMERIZATION OF CO/NON-CONJUGATED DIOLEFIN

[75] Inventor: Eit Drent, Amsterdam, Netherlands

[73] Assignee: Shell Oil Company, Houston, Tex.

[21] Appl. No.: 833,202

[22] Filed: Feb. 10, 1992

[30] Foreign Application Priority Data

Mar. 21, 1991 [NL] Netherlands .................. 9100502

[51] Int. Cl.$^5$ .............................................. C08G 67/02
[52] U.S. Cl. ........................................................... 528/392
[58] Field of Search ........................................... 528/392

[56] References Cited

U.S. PATENT DOCUMENTS

| | | |
|---|---|---|
| 4,843,144 | 6/1989 | Van Broekhoven et al. . |
| 4,880,903 | 11/1989 | Van Broekhoven et al. . |
| 4,904,759 | 2/1990 | Drent . |
| 4,940,775 | 7/1990 | Drent ................................ 528/392 |
| 4,940,777 | 7/1990 | Drent ................................ 528/392 |
| 5,041,530 | 8/1991 | Van Doorn et al. . |
| 5,049,650 | 9/1991 | Drent et al. ...................... 528/392 |

FOREIGN PATENT DOCUMENTS

| | | |
|---|---|---|
| 121965 | 10/1984 | European Pat. Off. . |
| 181014 | 5/1986 | European Pat. Off. . |
| 315266 | 5/1989 | European Pat. Off. . |
| 357101 | 3/1990 | European Pat. Off. . |
| 376364 | 7/1990 | European Pat. Off. . |

*Primary Examiner*—Harold D. Anderson

[57] ABSTRACT

Novel polymers containing alternating units of carbon monoxide and units derived from non-conjugated diolefinic hydrocarbon are produced by contacting the carbon monoxide and non-conjugated diolefinic hydrocarbon under polymerization conditions in the presence of a catalyst composition formed from a compound of palladium, the anion of a strong non-hydrohalogenic acid and a bidentate ligand of phosphorus having only aliphatic monovalent phosphorus substituents.

18 Claims, No Drawings

POLYMERIZATION OF CO/NON-CONJUGATED DIOLEFIN

FIELD OF THE INVENTION

This invention relates to novel copolymers of carbon monoxide and at least one non-conjugated diolefin. More particularly, the invention relates to a process for the production of such polymers wherein carbon monoxide units alternate with a unit derived from non-conjugated diolefin.

BACKGROUND OF THE INVENTION

The class of linear alternating copolymers of carbon monoxide and at least one mono-olefinically unsaturated hydrocarbon is now well known in the art. Such polymers, produced for example by the processes of van Broekhoven et al, U.S. Pat. Nos. 4,843,144 and 4,880,903, are represented by the repeating formula

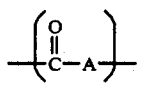

(I)

wherein A is derived from at least one mono-ethylenical unsaturated hydrocarbon polymerized through the ethylenic unsaturation thereof. The scope of the production of such linear alternating polymers is extensive but the polymerization is preferably conducted in the presence of a catalyst composition formed from a compound of a Group VIII metal selected from palladium, cobalt or nickel, an anion of a strong non-hydrohalogenic acid and a bidentate ligand of phosphorus, nitrogen or sulfur. Although a wide variety of bidentate ligands are useful in the polymerization process, the preferred ligands are bidentate ligands of phosphorus containing aromatic monovalent phosphorus substituents. Particularly good results are often obtained using catalyst compositions formed from 1,3-bis(diphenylphosphino)propane or 1,3-bis[di(2-methoxyphenyl)-phosphino]propane.

Somewhat more difficult considerations apply to the production of the alternating polymers when part or all of the mono-olefin is replaced with a diolefin. In U.S. Pat. No. 4,940,777 there is described a process of producing copolymers of carbon monoxide and an $\alpha$-$\beta$-diolefin. The process utilizes a catalyst composition as described above wherein the bidentate ligand is a bidentate ligand of nitrogen such as 2,2'-bipyridine. Catalyst compositions formed from a compound of palladium, the anion of a strong non-hydrohalogenic acid and tetraaryl phosphorus bidentate ligands are useful in the production of linear alternating terpolymers of carbon monoxide, $\alpha$-monoolefin and either conjugated or non-conjugated diolefins. See, for example, U.S. Pat. No. 4,904,759 or U.S. Pat. No. 4,940,775. It would be of advantage, however, to provide a process for the production of alternating copolymers of carbon monoxide and non-conjugated diolefins.

SUMMARY OF THE INVENTION

The present invention provides a method for the production of novel copolymers of carbon monoxide and at least one non-conjugated diolefin. More particularly, the present invention provides such a process utilizing a catalyst composition formed from a compound of palladium, the anion of a strong non-hydrohalogenic acid and a bidentate ligand of phosphorus wherein all monovalent phosphorus substituents are aliphatic.

DESCRIPTION OF THE INVENTION

The process of the invention comprises the contacting of carbon monoxide and at least one aliphatic non-conjugated diolefinic hydrocarbon under polymerization conditions in the presence of a compound of palladium, the anion of a strong non-hydrohalogenic acid and a bidentate ligand of phosphorus having only aliphatic monovalent phosphorus substituents.

The aliphatic non-conjugated diolefinic hydrocarbon contains up to 10 carbon atoms inclusive. Such diolefinic hydrocarbons are illustrated by 1,4-pentadiene, 1,5-hexadiene, 1,4-hexadiene, 1,4-heptadiene, 1,6-heptadiene, 1,5-octadiene, 1,6-octadiene, 1,7-octadiene, 2-methyl-1,4-pentadiene, 2-methyl-1,7-octadiene and 7-methyl-1,6-octadiene. The preferred non-conjugated diolefinic hydrocarbons are $\alpha$-$\omega$-diolefins and particularly straight chain $\alpha$-$\omega$-diolefins such as 1,5-hexadiene, 1,6-heptadiene and 1,7-octadiene.

The non-conjugated diolefinic hydrocarbon is contacted with carbon monoxide under polymerization conditions in the presence of a liquid reaction diluent and a catalyst composition formed from a compound of palladium, the anion of a non-hydrohalogenic acid having a pKa below 4 and preferably below 2, and a bidentate ligand of phosphorus having aliphatic monovalent phosphorus substituents. The compound of palladium is preferably a palladium carboxylate and palladium acetate, palladium propionate, palladium butyrate and palladium hexanoate are satisfactory. Palladium acetate is particularly preferred.

The anion of the non-hydrohalogenic acid is suitably the anion of a mineral acid such as sulfuric acid or perchloric acid or an organic acid including a carboxylic acid such as dichloroacetic acid, trichloroacetic acid or trifluoroacetic acid as well as a sulfonic acid such as methanesulfonic acid, trifluoromethanesulfonic or p-toluenesulfonic acid. Sulfonic acids, particularly trifluoromethanesulfonic acid, are preferred. The anion is provided as the free acid although alternatively the anion is provided as a metal salt, particularly as a salt of a non-noble Group VIII metal. The anion is provided to the catalyst composition in an amount from about 1 mol to about 100 mols per mol of palladium. Quantities of anion from about 2 mols to about 50 mols per mol of palladium are preferred.

The bidentate phosphine ligand of the process of the invention is a compound of the formula

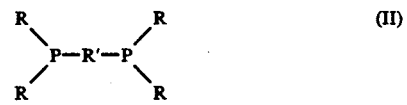

(II)

wherein R independently is an aliphatic group of up to 10 carbon atoms inclusive, and R' is a divalent hydrocarbyl bridging group of up to 10 carbon atoms inclusive with from 2 to 4 carbons in the bridge. The R group is hydrocarbyl containing only atoms of carbon and hydrogen or is substituted hydrocarbyl containing additional atoms as inert carbon atom substituents. Illustrative R groups include methyl, ethyl, n-butyl, hexyl, octyl, decyl, 2-chloroethyl and 3,4-dichlorobutyl. The preferred R group is straight-chain hydrocarbyl of up to 5 carbon atoms inclusive and particularly preferred as each R substituent is ethyl or butyl. Illustrative R' groups include 1,2-ethylene, 1,3-propylene, 1,3-butylene and 2,2-dimethyl-1,3-propylene. Preferred as the R' group is 1,3-propylene, i.e., trimethylene, and particularly preferred as the bidentate phosphorus ligand is 1,3-bis(di-n-butylphosphino)propane. In the catalyst composition the bidentate phosphorus ligand is employed in a quantity of from 0.5 mole to about 2 moles per mole of palladium. Preferred quantities of ligand are from about 0.75 mole to about 1.5 mole of ligand per mole of palladium.

It is useful on occasion to include within the catalyst composition a small amount of organic oxidizing agent. Suitable organic oxidizing agents include aliphatic nitrites such as butyl nitrite, aromatic nitro compounds such as nitrobenzene and 2,4-dinitrololuene and hydroquinones, both 1,2-hydroquinones and 1,4-hydroquinones. Preferred organic oxidizing agents are 1,4-hydroquinones, particularly 1,4-benzoquinone and 1,4-naphthoquinone. As stated, the presence of organic oxidizing agent is not required and amounts up to about 5000 moles of oxidizing agent per mole of palladium are satisfactory. When oxidizing agent is present, amounts from about 10 moles to about 5000 moles per mole of palladium are preferred.

The carbon monoxide and non-conjugated diolefinic hydrocarbon are contacted under polymerization conditions in the presence of a liquid reaction diluent and a catalytic quantity of the catalyst composition. The molar ratio of carbon monoxide to total non-conjugated diolefin is from about 10:1 to about 1:10, but molar ratios from about 5:1 to about 1:5 are preferred. The reaction diluent is a diluent in which at least a portion of the catalyst composition components are soluble and the polymer product is at least substantially insoluble. Illustrative of such reaction diluents are alkanols such as methanol and ethanol and alkanones such as acetone and methyl ethyl ketone. The use of methanol as the reaction diluent is preferred. Typical polymerization conditions include a reaction temperature from about 20° C. to about 150° C. but preferably from about 30° C. to about 130° C. Reaction pressures from about 2 bar to about 150 bar are satisfactory but pressures from about 5 bar to about 100 bar are more often utilized. The catalyst composition is used in a quantity sufficient to provide from about $1 \times 10^{-7}$ mole to about $1 \times 10^{-3}$ mole of palladium per mole of total non-conjugated diolefinic hydrocarbon. Quantities of catalyst composition which provide from about $1 \times 10^{-6}$ mole to about $1 \times 10^{-4}$ mole of palladium per mole of total non-conjugated diolefin are preferred.

The contacting of the monomeric reactants, the reaction diluent and the catalyst composition is conducted in an autoclave or similar pressure reaction vessel. The contacting is facilitated by some means of agitation such as shaking or stirring. Subsequent to polymerization, the reaction is terminated as by cooling the reactor and releasing the pressure. The polymer product is obtained as a material substantially insoluble in the reaction media and is recovered as by filtration or decantation. The polymer is used as such or is purified as by contact with a solvent or extracting agent which is selective for catalyst residues.

The polymer product is an alternating polymer in which units of carbon monoxide alternate with units derived from the non-conjugated diolefin. The units derived from the non-conjugated diolefin are of two types with the proportion of each type depending in part on the particular diolefin employed. The minor type of unit derived from the non-conjugated diolefinic hydrocarbon is that moiety obtained by polymerization through one of the ethylenic double bonds. The resulting unit will be a group pendant from the polymer chain and contains unreacted ethylenic unsaturation. The major type of unit derived from the non-conjugated diolefin is that unit obtained by cyclization of two molecules of the diolefin and one molecule of carbon monoxide to form a cyclic ketone-type structure, e.g., a substituted cyclopentanone structure. In the embodiment of the process of the invention where 1,5-hexadiene is the diolefinic monomer, the cyclic ketone unit is present as substantially the only unit and no ethylenic unsaturation is observed in the polymer product when examined by NMR. In the case of diolefinic monomers of 7 or more carbon atoms, there will be a measurable proportion of a cyclic unit derived from the diolefinic monomer and NMR analysis of the product polymer will indicate that 10% to 20% or a somewhat higher proportion of the original diolefinic units is still present in the polymer product. Thus, the polymer product is characterized by alternating units of carbon monoxide and units derived from the non-conjugated diolefinic hydrocarbon, which units are monomeric units obtained by polymerization of the diolefinic hydrocarbon through one ethylenic unsaturation thereof or alternatively are cycloketone units obtained by cyclization of two moieties of diolefinic hydrocarbon and one moiety of carbon monoxide.

The polymeric products of the present invention are thermoplastic and have utilities normally associated with thermoplastic polymers. They are processed by methods conventional for thermoplastics, e.g., extrusion, injection molding and thermoforming, into a variety of shaped articles. Specific applications include containers for food and drink and parts and housings for automotive applications.

The invention is further illustrated by the following Comparative Examples (not of the invention) and the Illustrative Embodiments which should not be regarded as limiting. In each Illustrative Embodiment, the polymer product contained units derived from carbon monoxide alternating with units derived from the diolefins, as evidenced by NMR analysis. The products of Illustrative Embodiments I and II were examined by NMR which indicated that the units derived from 1,5-hexadiene were present substantially in a cycloketone structure. No olefinic double bonds were observed in these products. In the product of Illustrative Embodiment III, the units derived from 1,6-heptadiene were largely present in the form of cycloketone units but about 10% of the ethylenic double bonds originally present in the diolefin were present in the polymer. In Illustrative Embodiments IV and V the units derived from 1,7-octadiene were also largely present in cycloketone structures but about 20% of the ethylenic double bonds present in the diolefin were present in the polymer.

ILLUSTRATIVE EMBODIMENT I

A carbon monoxide/1,5-hexadiene copolymer was produced by charging to an autoclave of 250 ml capacity equipped with a mechanical stirrer a catalyst composition solution comprising 100 ml methanol, 0.1 mmol palladium acetate, 0.5 mmol nickel perchlorate and 0.12 mmol 1,3-bis(di-n-butylphosphino)propane. After the air in the autoclave had been removed by evacuation, 20 ml of 1,5-hexadiene was introduced. Carbon monoxide was then charged to the autoclave until a pressure of 40 bar was reached. The autoclave and contents were then heated to 50° C. After 5 hours the polymerization was terminated by cooling the autoclave and contents to room temperature and releasing the pressure. The resulting polymer was recovered by filtration, washed with methanol and dried. A yield of 4 grams of copolymer was obtained.

ILLUSTRATIVE EMBODIMENT II

A copolymer of carbon monoxide and 1,5-hexadiene was prepared by a procedure substantially similar to that of Illustrative Embodiment I, except that the reaction temperature was 22° C. instead of 50° C. and the reaction time was 15 hours instead of 5 hours. The yield of copolymer was 3 g.

ILLUSTRATIVE EMBODIMENT III

A copolymer of carbon monoxide and 1,6-heptadiene was prepared by a procedure substantially similar to that of Illustrative Embodiment I, except that 10 ml of 1,5-heptadiene was employed instead of 1,5-hexadiene. The yield of copolymer was 2 g.

ILLUSTRATIVE EMBODIMENT IV

A copolymer of carbon monoxide and 1,7-octadiene was produced by a procedure substantially similar to that of Illustrative Embodiment I except that 20 ml of 1,7-octadiene was introduced into the autoclave instead of 1,5-hexadiene and the reaction temperature was 35° C. instead of 50° C. The yield of copolymer was 3 g.

ILLUSTRATIVE EMBODIMENT V

A carbon monoxide/1,7-octadiene copolymer was produced by a procedure substantially similar to that of Illustrative Embodiment I except that 20 ml of 1,7-octadiene was used instead of 1,5-hexadiene, the reaction temperature was 22° C. instead of 50° C. and the reaction time was 18 hours instead of 5 hours. The yield of copolymer was 2 g.

COMPARATIVE EXAMPLE I

The procedure of Illustrative Embodiment I was repeated except that the catalyst composition solution comprised 100 ml methanol, 0.1 mmol palladium acetate, 2 mmol p-toluenesulfonic acid, 3 mmol 2,2'-bipyridine and 10 mmol 1,4-benzoquinone, and the temperature of heating was 70° C. instead of 50° C. No polymeric product was formed.

COMPARATIVE EXAMPLE II

The procedure of Illustrative Embodiment I was repeated except that the catalyst composition solution comprised 100 ml methanol, 0 5 mmol nickel perchlorate, 0.12 mmol 1,3-bis(diphenylphosphino)propane and 5 mmol 1,4-naphthoquinone. No polymer was formed.

What is claimed is:

1. A process for the production of a polymer having alternating units of carbon monoxide and units derived from at least one non-conjugated diolefinic hydrocarbon which comprises contacting carbon monoxide and non-conjugated diolefinic hydrocarbon under polymerization conditions in the presence of a liquid reaction diluent and a catalytic quantity of a catalyst composition formed from a compound of palladium, the anion of a strong non-hydrohalogenic acid and a bidentate ligand of phosphorus wherein each monovalent phosphorus substituent is aliphatic.

2. The process of claim wherein the bidentate phosphorus ligand is represented by the formula

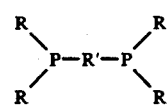

wherein R independently is aliphatic of up to 10 carbon atoms inclusive and R' is a divalent hydrocarbon bridging group of up to 10 carbon atoms inclusive with from 2 to 4 carbon atoms in the bridge.

3. The process of claim 2 wherein the compound of palladium is palladium acetate.

4. The process of claim 3 wherein the anion is the anion of an acid having a pKa below 2.

5. The process of claim 4 wherein the diolefinic hydrocarbon is an $\alpha$-$\omega$ diolefin of up to 10 carbon atoms inclusive.

6. The process of claim 5 wherein the diolefin is 1,5-hexadiene, 1,6-heptadiene or 1,7-octadiene.

7. The process of claim 6 wherein R is straight-chain of up to 5 carbon atoms inclusive.

8. The process of claim 7 wherein R' is trimethylene.

9. The process of claim 8 wherein R is ethyl.

10. The process of claim 8 wherein R is n-butyl.

11. The process of claim 10 wherein the anion is perchlorate.

12. The process of claim 10 wherein the anion is the anion of trifluoromethanesulfonic acid.

13. The process of claim 10 wherein the diolefin is 1,5-hexadiene.

14. The process of claim 10 wherein the diolefin is 1,6-heptadiene.

15. The process of claim 10 wherein the diolefin is 1,7-octadiene.

16. The alternating copolymer produced by the process of claim 1 from monomers consisting of carbon monoxide and an $\alpha$-$\omega$ diolefin of up to 10 carbon atoms.

17. The alternating copolymer produced by the process of claim 1 from monomers consisting of carbon monoxide and $\alpha$-$\omega$ diolefin, wherein the $\alpha$-$\omega$ diolefin is 1,5-hexadiene, 1,6-heptadiene, or 1,7-octadiene.

18. The alternating copolymer of claim 17, wherein the bidentate ligand of phosphorus is 1,3-bis(di-n-butylphosphino)propane.

* * * * *